(12) United States Patent
Behrens et al.

(10) Patent No.: US 10,575,470 B2
(45) Date of Patent: Mar. 3, 2020

(54) REPAIR, CONVERSION OR RETROFIT KIT FOR A ROUND BALER

(71) Applicant: ContiTech Transportbandsysteme GmbH, Hannover (DE)

(72) Inventors: Carsten Behrens, Bilshausen (DE); Lysander Stange, Northeim (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 565 days.

(21) Appl. No.: 15/185,270

(22) Filed: Jun. 17, 2016

(65) Prior Publication Data
US 2017/0000035 A1 Jan. 5, 2017

(30) Foreign Application Priority Data

Jul. 3, 2015 (DE) .................. 10 2015 212 482

(51) Int. Cl.
*A01F 15/07* (2006.01)
*A01F 15/08* (2006.01)
*A01F 15/18* (2006.01)

(52) U.S. Cl.
CPC .............. *A01F 15/18* (2013.01); *A01F 15/07* (2013.01); *A01F 2015/077* (2013.01); *A01F 2015/078* (2013.01); *A01F 2015/183* (2013.01)

(58) Field of Classification Search
CPC ...... A01F 15/18; A01F 15/07; A01F 15/0705; A01F 15/14; A01F 15/08;
(Continued)

(56) References Cited

U.S. PATENT DOCUMENTS 3,964,246 A * 6/1976 Kopaska ................. A01F 15/07
56/341
3,980,013 A * 9/1976 Bredeson ............... B30B 9/121
100/117
(Continued)

FOREIGN PATENT DOCUMENTS

EP 2695512 A1 2/2014

OTHER PUBLICATIONS

EP Search Report dated Aug. 22, 2016 of EP application 16 163 787.1 claiming priority to DE 10 2015 212 482.7 on which this application is based.

*Primary Examiner* — Gregory D Swiatocha
*Assistant Examiner* — Katie L. Parr
(74) *Attorney, Agent, or Firm* — David L. Cate; Gregory Adams

(57) ABSTRACT

A repair, conversion or retrofit kit includes at least two continuously closable replacement baler belts which correspond substantially in their combined width to the width of a continuously closed baler belt to be replaced. The replacement baler belts may be closable in a force-fitting and/or form-fitting manner by a connecting means, and the connecting means may be at least partially hook connectors. In some embodiments, the repair, conversion or retrofit kit further includes at least one guide means arranged on the round baler such that at least two replacement baler belts each extend laterally with respect to the at least one guide means, and the at least two replacement baler belts are guided laterally with respect to one another. In some cases, the guide means is an auxiliary guide disk arranged on a rotatable shaft of the round baler.

4 Claims, 4 Drawing Sheets

(58) Field of Classification Search
CPC .......... A01F 2015/077; A01F 2015/078; A01F 2015/183; A01D 85/005; A01D 39/00; F16G 3/16; B65G 15/00; B65G 15/10; B65G 15/12; B65G 15/20
USPC .......... 100/87, 88; 198/844.1, 844.2; 2/920; 24/8, 20 EE, 38, 93, 265, 906, 910
See application file for complete search history.

(56) References Cited

U.S. PATENT DOCUMENTS

| | | | | |
|---|---|---|---|---|
| 3,992,987 | A | * | 11/1976 | Sereg ..................... A01F 15/07 100/88 |
| 5,219,063 | A | * | 6/1993 | Wyatt .................... B65G 39/16 198/840 |
| 5,284,457 | A | * | 2/1994 | Gerstenberger ...... F16D 1/0858 198/836.4 |
| 5,415,913 | A | | 5/1995 | Clevenger, Jr. |
| 6,311,393 | B1 | * | 11/2001 | Garner ..................... F16G 3/04 29/243.51 |
| 2006/0278499 | A1 | | 12/2006 | Grywacheski et al. |

* cited by examiner

REPAIR, CONVERSION OR RETROFIT KIT FOR A ROUND BALER

CROSS REFERENCE TO RELATED APPLICATIONS

This application claims priority to German patent application number 10 2015 212 482.7, filed Jul. 3, 2015, and the entire content of this application is incorporated herein by reference.

FIELD

The invention relates to a repair, conversion or retrofit kit for a round baler, and particularly a kit including continuously closable replacement baler belts.

BACKGROUND

This section provides background information to facilitate a better understanding of the various aspects of the disclosure. It should be understood that the statements in this section of this document are to be read in this light, and not as admissions of prior art.

In agriculture, use is made of what are known as round balers for pressing stalk-like harvested material into bales. To this end, the harvested material is conveyed into the baling chamber and compressed to form a cylindrical bale by pressing means, for example baler belts, surrounding said baling chamber, said bale being discharged onto the field when a predetermined size has been reached. Such round balers are known for example from DE 10 2011 003 727 A1, from U.S. Pat. No. 5,415,013 A1 and from EP 2 695 512 A1.

The baler belts are configured in a continuously closed manner and extend parallel to one another. The baler belts can be produced in an open manner and then closed in a form-fitting manner by means of mechanical connecting elements, see for example U.S. Pat. No. 5,415,013 A1. Limits of about 300 mm belt width are imposed on this type of connection because wider baler belts can be controlled only with great difficulty within the round baler on account of irregular force distributions in the baler belt. Wider baler belts are therefore produced in a manner wound in a closed manner, see for example US 2008/0105517 A1. A plurality of baler belts that extend parallel to one another are usual in a round baler, see for example DE 10 2011 003 727 A1 or EP 2 695 512 A1, or else an individual baler belt.

Since the gaps in the longitudinal direction between the individual baler belts can result in losses of the baling material, development is moving toward the use of as few baler belts as possible in a round baler. These are configured in a correspondingly wide manner and can then be produced only as continuous belts for the abovementioned reasons. Therefore, usually one, two or three continuously wound baler belts are currently used in round balers.

Baler belts can be damaged in use and even tear, with the result that the use of the round baler can be interrupted. A continuously wound baler belt can then be optionally repaired by means of cold vulcanization, although this requires appropriate equipment which can be complex and expensive. This type of repair can also require the removal and installation of the baler belt and it can take up to 24 hours to carry out the cold vulcanization. If a continuously wound baler belt is intended to be replaced, this also results in a long time requirement of usually up to one day. In both cases, such measures can usually be carried out only by trained specialist personnel, this further increasing the complexity, the time delay and the costs.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, a repair, conversion or retrofit kit for a round baler is provided, where the kit includes at least two continuously closable replacement baler belts which correspond substantially in their combined width to the width of a continuously closed baler belt to be replaced. In some cases the replacement baler belts are closable in a force-fitting and/or form-fitting manner by a connecting means, and the connecting means may be, in some aspects, at least partially hook connectors. Also, in some aspects, the replacement baler belts have the same width.

In some embodiments, the repair, conversion or retrofit kit further includes at least one guide means arranged on the round baler such that at least two replacement baler belts each extend laterally with respect to the at least one guide means, and the at least two replacement baler belts are guided laterally with respect to one another. In some cases, the guide means is an auxiliary guide disk arranged on a rotatable shaft of the round baler, and the auxiliary guide disk may, in some aspects, be configured in a split manner such that it is fastened to the rotatable shaft by placing the auxiliary guide disk around the rotatable shaft. In some embodiments, the auxiliary guide disk is configured as two half-disks. The auxiliary guide disk may include fastening means for fastening to the rotatable shaft in a force-fitting and/or form-fitting manner such that a relative movement between the auxiliary guide disk and rotatable shaft is avoided.

In another aspect of the disclosure, a repair, conversion or retrofit kit for a round baler includes at least two continuously closable replacement baler belts and at least one guide means arranged on the round baler such that at least two continuously closable replacement baler belts each extend laterally with respect to the at least one guide means, and the at least two continuously closable replacement baler belts are guided laterally with respect to one another. The guide means may be an auxiliary guide disk arranged on a rotatable shaft of the round baler, and in some aspects, the auxiliary guide disk is configured in a split manner such that it is fastened to the rotatable shaft by placing the auxiliary guide disk around the rotatable shaft. The repair, conversion or retrofit kit may further include fastening means for fastening the auxiliary guide disk to the rotatable shaft in a force-fitting and/or form-fitting manner such that a relative movement between the auxiliary guide disk and rotatable shaft is avoided.

In some aspects, the at least two continuously closable replacement baler belts correspond substantially in their combined width to the width of a continuously closed baler belt to be replaced. The replacement baler belts may be closable in a force-fitting and/or form-fitting manner by a connecting means, and the connecting means may be at least partially hook connectors.

Yet another aspect of the disclosure is balers having a repair, conversion or retrofit kit therein, which includes at least two replacement baler belts which correspond substantially in their combined width to the width of a continuously closed baler belt to be replaced, and the at least two replacement baler belts are able to be continuously closed. In some aspects, the repair, conversion or retrofit kit further includes at least one guide means arranged on the round baler such that at least two continuously closable replacement baler belts each extend laterally with respect to the at least one guide means, and the at least two continuously closable replacement baler belts are guided laterally with respect to one another.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
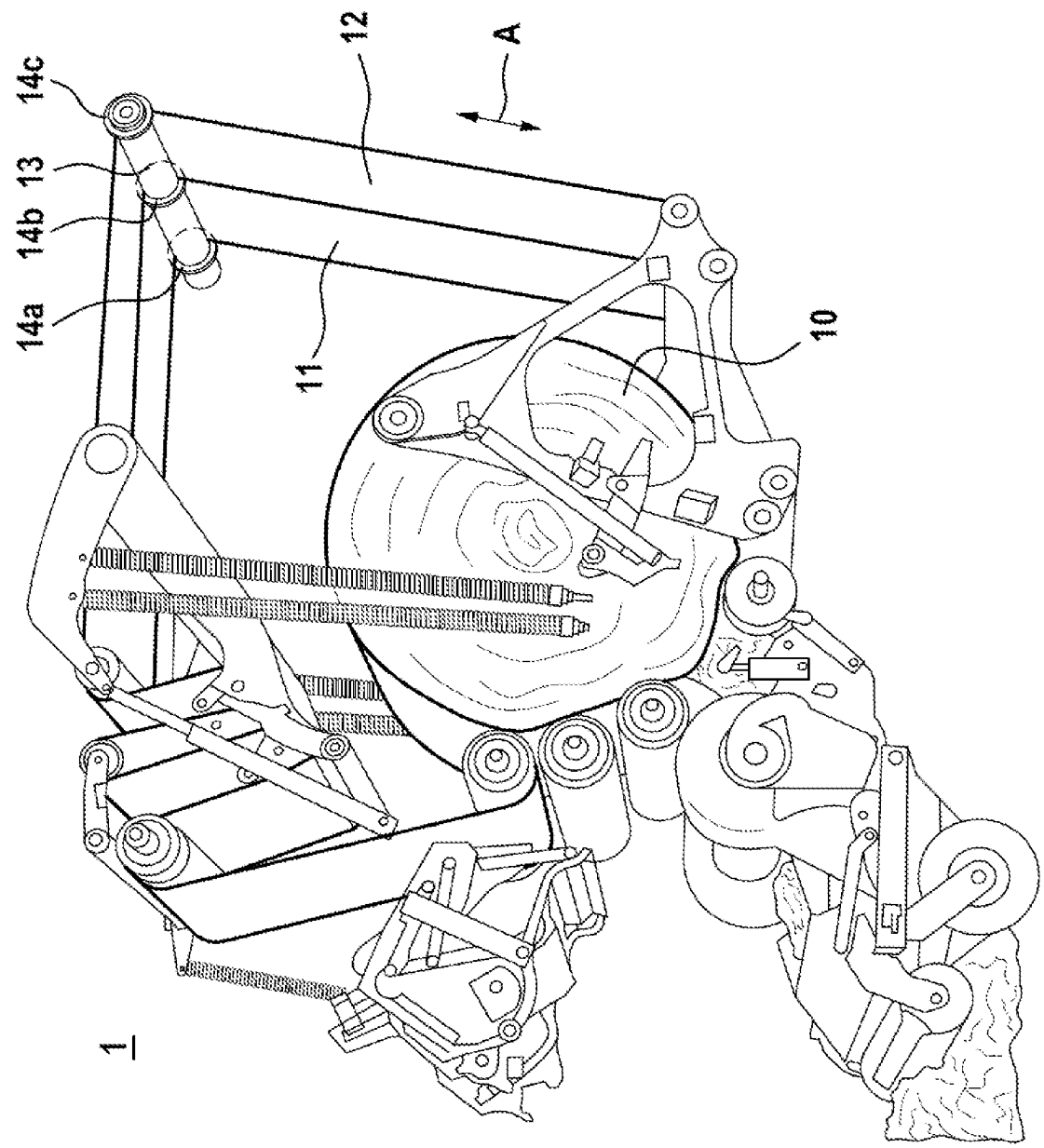
FIG. 1 shows a perspective schematic illustration of a round baler and the inner workings thereof (based on a 900 Series round baler from John Deere) according to the prior art.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure.

It is an object of embodiments of the disclosure to simplify and/or accelerate the replacement of a damaged baler belt of a round baler. In particular, the replacement should be able to be carried out as quickly and easily as possible by the user themselves without specialist personnel and/or special equipment. In addition, following the replacement of the damaged baler belt, full tensile loading should be immediately available.

This object is achieved according to some embodiments of the disclosure by a repair, conversion or retrofit kit having the features of at least two continuously closable replacement baler belts which correspond in their joint width substantially to the width of a continuously closed baler belt to be replaced. In some embodiments, the object is achieved by a round baler having a repair, conversion or retrofit kit at least two replacement baler belts being able to be continuously closed.

Thus, embodiments of the disclosure relate to a repair, conversion or retrofit kit for a round baler. This kit can be used to replace a damaged baler belt and as a result to repair the round baler. This can be used as a temporary solution in order to be able to continue and complete the current use of the round baler as quickly as possible, so that an "original baler belt" can subsequently be fitted again. However, this kit can also be used to replace an intact baler belt of a round baler and as a result to permanently convert or retrofit the round baler.

The repair, conversion or retrofit kit has at least two continuously closable replacement baler belts which correspond in their joint width substantially to the width of a continuously closed baler belt to be replaced. The baler belt to be replaced is in particular a continuously wound baler belt which is embodied in particular as an original accessory of the round baler. The at least two replacement baler belts preferably correspond substantially to the properties of the baler belt to be replaced in terms of length and thickness and also in terms of structure and quality. The at least two replacement baler belts together have approximately the same width as the baler belt to be replaced, such that as little difference as possible in the function of the round baler and in the quality of the round baler produced results from this replacement.

Some embodiments of the disclosure are based on the finding that it is much quicker and simpler to replace an in particular continuously wound baler belt with two narrower replacement baler belts. This can be carried out for example directly in the field, in particular, by the user of the round baler themselves in the case of a damaged baler belt. In addition, the need for additional aids, systems and/or specialist personnel can be reduced or completely avoided as a result. All of this can considerably reduce downtimes of the round baler in the event of a damaged baler belt. Thus, the use of the round baler can be continued promptly. Following completion of the use, the two replacement baler belts can then still be replaced by a continuously wound baler belt in order to re-establish the state prior to the repair. It is also possible for older and used round balers to be modernized quickly and easily in this way.

According to one aspect of the disclosure, the replacement baler belts are closable in a force-fitting and/or form-fitting manner by means of connecting means. In this way, a reliably durable but easily producible connection can be created in order to continuously close the replacement baler belts. In particular, complex aids, which would require for example cold vulcanization, are not necessary for this purpose.

According to a further aspect of the disclosure, the connecting means are at least partially hook connectors. Hook connectors are particularly suitable for the continuous connection of baler belts because the hooks can be provided at the two open ends of the replacement baler belt at the factory such that, in order to close the connection, all that is necessary is for the hooks to be hooked together or to be connected by means of a joint element. It is also possible, by way of replacement baler belts that are closed with hook connectors, to absorb the same or comparable tensile loading as with continuously wound baler belts, such that as a result, after the repair, the round baler can continue to be operated as before. Preferably, all of the connecting means are configured as hook connectors in order to be able to use the above-described advantages in the best possible manner.

According to a further aspect of the disclosure, the replacement baler belts have the same width. This is advantageous because only one width of baler belt can be used within the repair, conversion or retrofit kit. This simplifies the production and use of the repair, conversion or retrofit kit.

According to a further aspect of the disclosure, the repair, conversion or retrofit kit also has at least one guide means which can be arranged on the round baler such that at least two replacement baler belts can each extend laterally with respect to the guide means and as a result can be guided laterally with respect to one another. This additional guide means can serve to laterally space apart and laterally guide the two replacement baler belts with respect to one another such that the movement of the two replacement baler belts can be executed more reliably. This additional guide means can be arranged on the round baler in a fixed manner or so as to be movable relative to the latter, in particular so as to be able to rotate together with a rotatable shaft of the round baler.

According to a further aspect of the disclosure, the guide means is an auxiliary guide disk which can be arranged on a rotatable shaft of the round baler. This rotatable shaft of the round baler is one around which the baler belts run. Such rotatable shafts in the round baler already have guide means in the form of guide disks for laterally guiding the baler belts. If an originally present baler belt is now replaced by two replacement baler belts, the auxiliary guide disk can be arranged on this rotatable shaft between the two replacement baler belts in order to carry out the same task with regard to the two replacement baler belts, as the already present guide disks.

According to a further aspect of the disclosure, the auxiliary guide disk is configured in a split manner such that it can be fastened to the shaft around the latter. This allows the subsequent installation of the auxiliary guide disk without the rotatable shaft of the round baler having to be removed for this purpose. To this end, the auxiliary guide disks are split into at least two part disks such that the latter have a sufficiently wide opening in their circumferential direction in the split state in order to be able to be arranged around the rotatable shaft and to be closed fully around the rotatable shaft in the closed state.

According to a further aspect of the disclosure, the auxiliary guide disk is configured as two half-disks. These two half-disks are configured with a substantially identical width in their circumferential direction, such that they each enclose approximately 180° of a complete circle and can be closed jointly around the rotatable shaft in the assembled state. As a result, use can be made of two identical half-disks, thereby simplifying production. In addition, a wide opening is formed in the circumferential direction between the two half-disks, such that the two half-disks can be mounted very easily on the rotatable shaft. At the same time, the division of the auxiliary guide disk into two parts minimizes the number of part elements, in order to realize the above-described advantages.

According to a further aspect of the disclosure, the repair, conversion or retrofit kit also has fastening means for fastening the auxiliary guide disk to the shaft in a force-fitting and/or form-fitting manner such that a relative movement between the auxiliary guide disk and shaft can be avoided. These fastening means can be preferably screws, clamps, split pins, wire or the like, which can ensure that the auxiliary guide disk is held securely on the rotatable shaft for example by radial pressure on the rotatable shaft or radial engagement in the rotatable shaft.

Some embodiments of the disclosure relates to a round baler having a repair, conversion or retrofit kit as described above, wherein at least two replacement baler belts can be continuously closed. As a result, the advantages outlined above of the repair, conversion or retrofit kit can be used on a round baler.

Figure 2:
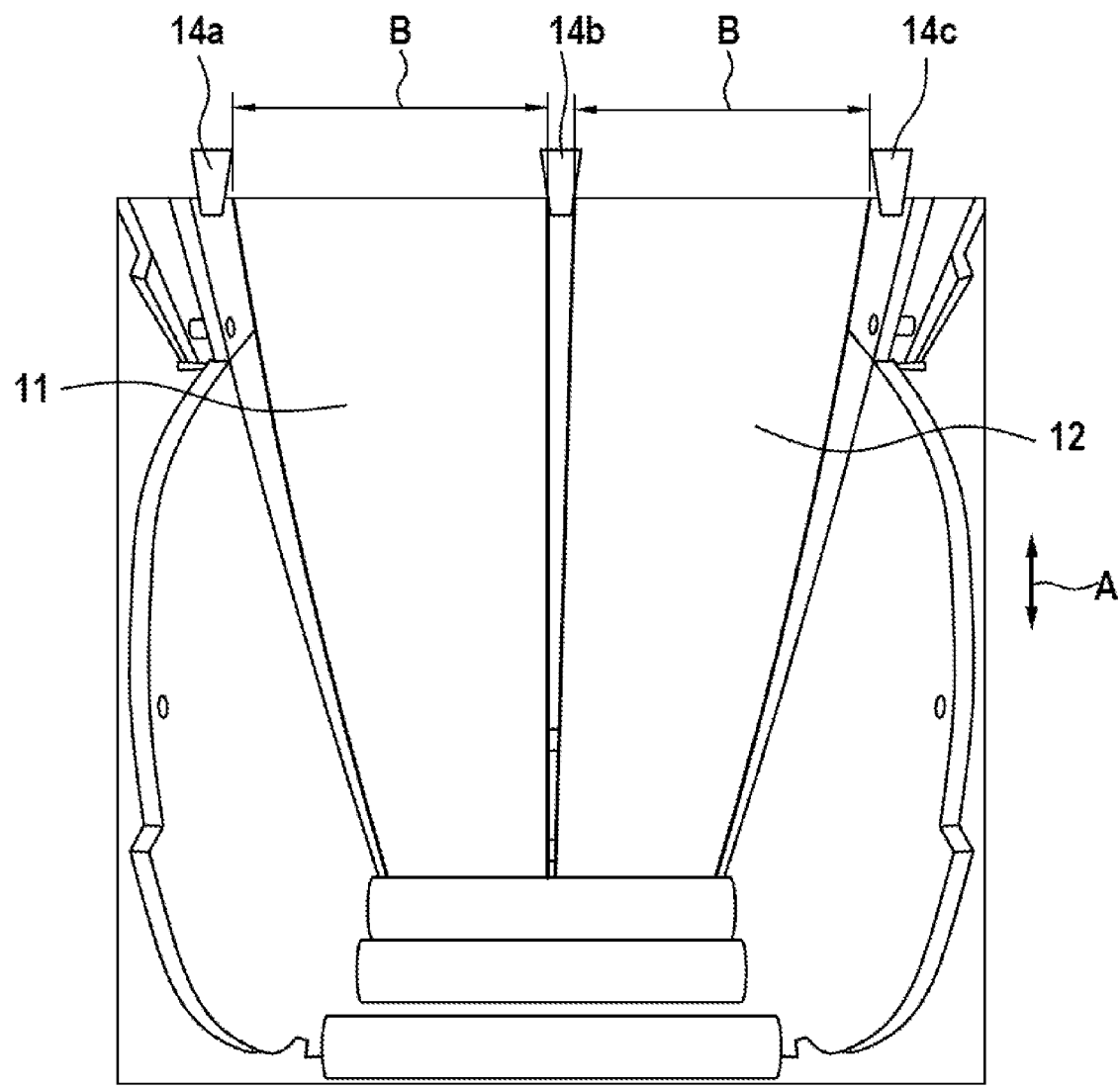
FIG. 2 shows a schematic illustration of two baler belts running in the round baler (based on the 900 Series round baler from John Deere) and having guide disks according to the prior art.

Now referencing the Figures. FIG. 1 shows a perspective schematic illustration of a round baler 1 and the inner workings thereof according to the prior art. FIG. 2 shows a schematic illustration of two baler belts 11, 12 running in the round baler 1 and having guide disks 14*a*, 14*b*, 14*c* according to the prior art.

In a round baler 1, a round bale 10 is pressed from loose harvested material. To this end, inter alia a plurality of baler belts, 11, 12, which run in a running direction A, surround the round bale 10 during the pressing operation. In this case, there are two baler belts 11, 12, which can be denoted first baler belt 11 and second baler belt 12. These two baler belts 11, 12 run parallel to one another in the running direction A and have the same width B. The two baler belts 11, 12 are configured in a continuously wound manner and are guided inter alia over a shaft 13 in a tensioned manner. Arranged on the shaft 13 are three guide disks 14*a*, 14*b*, 14*c*, which serve to laterally guide the two baler belts 11, 12. In this case, the first baler belt 11 is guided on the left-hand side by the left-hand guide disk 14*a* and on the right-hand side by the central guide disk 14*b*. The second baler belt 12 is guided on the left-hand side by the central guide disk 14*b* and on the right-hand side by the right-hand guide disk 14*c*.

When such a known round baler 1 is used, one of the baler belts 11, 12 can become damaged or even tear, and so it has to be replaced. In this case, dealt with in the following text, this is the first baler belt 11, which can then also be denoted baler belt 11 to be replaced. In order to minimize the downtimes and repair effort in such a case, the baler belt 11 to be replaced can be replaced according to the disclosure as described further below.

Figure 3:
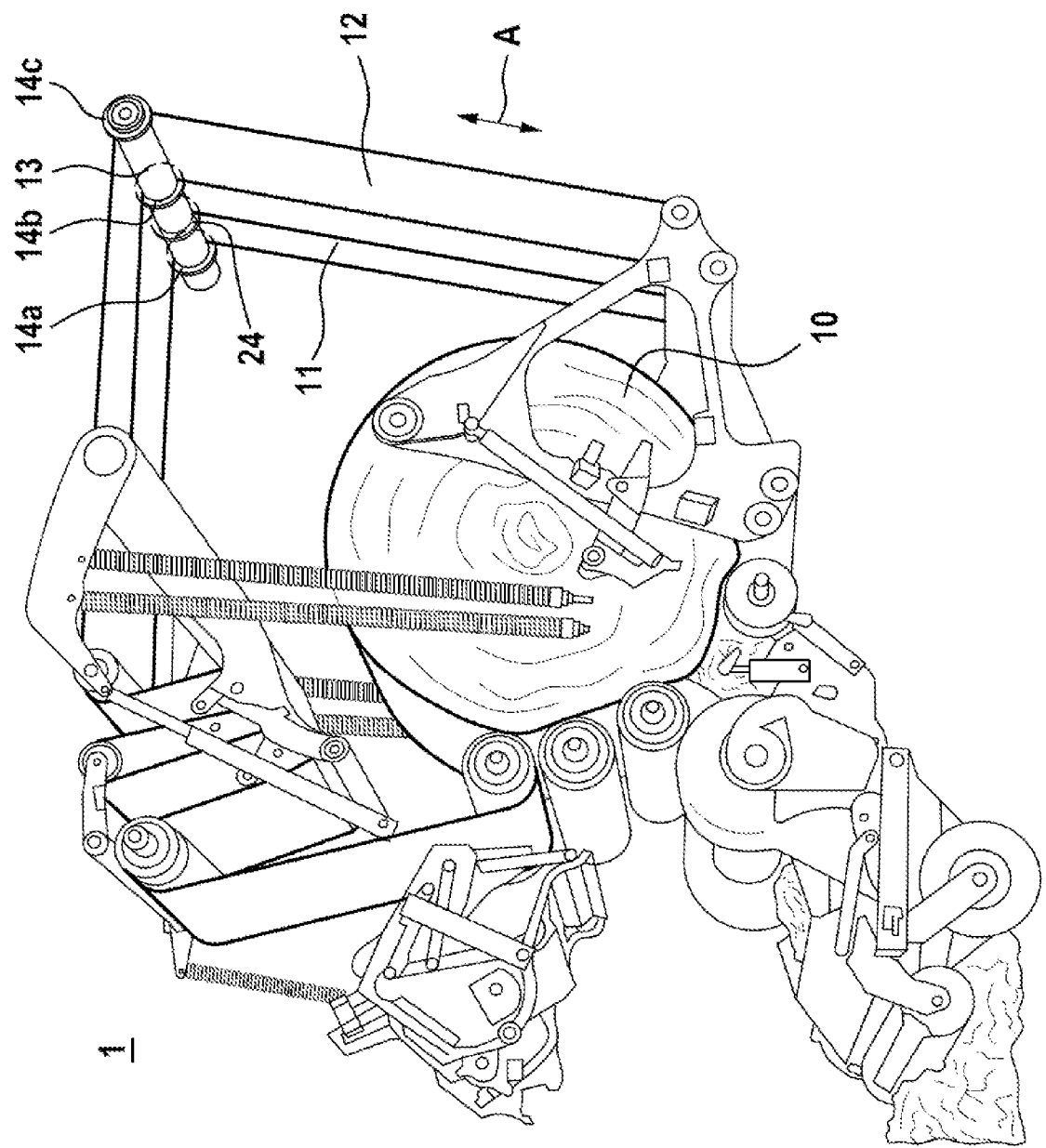
FIG. 3 shows a perspective schematic illustration of a round baler and the inner workings thereof (based on a 900 Series round baler from John Deere), with a repair, conversion or retrofit kit according to the disclosure.
Figure 4:
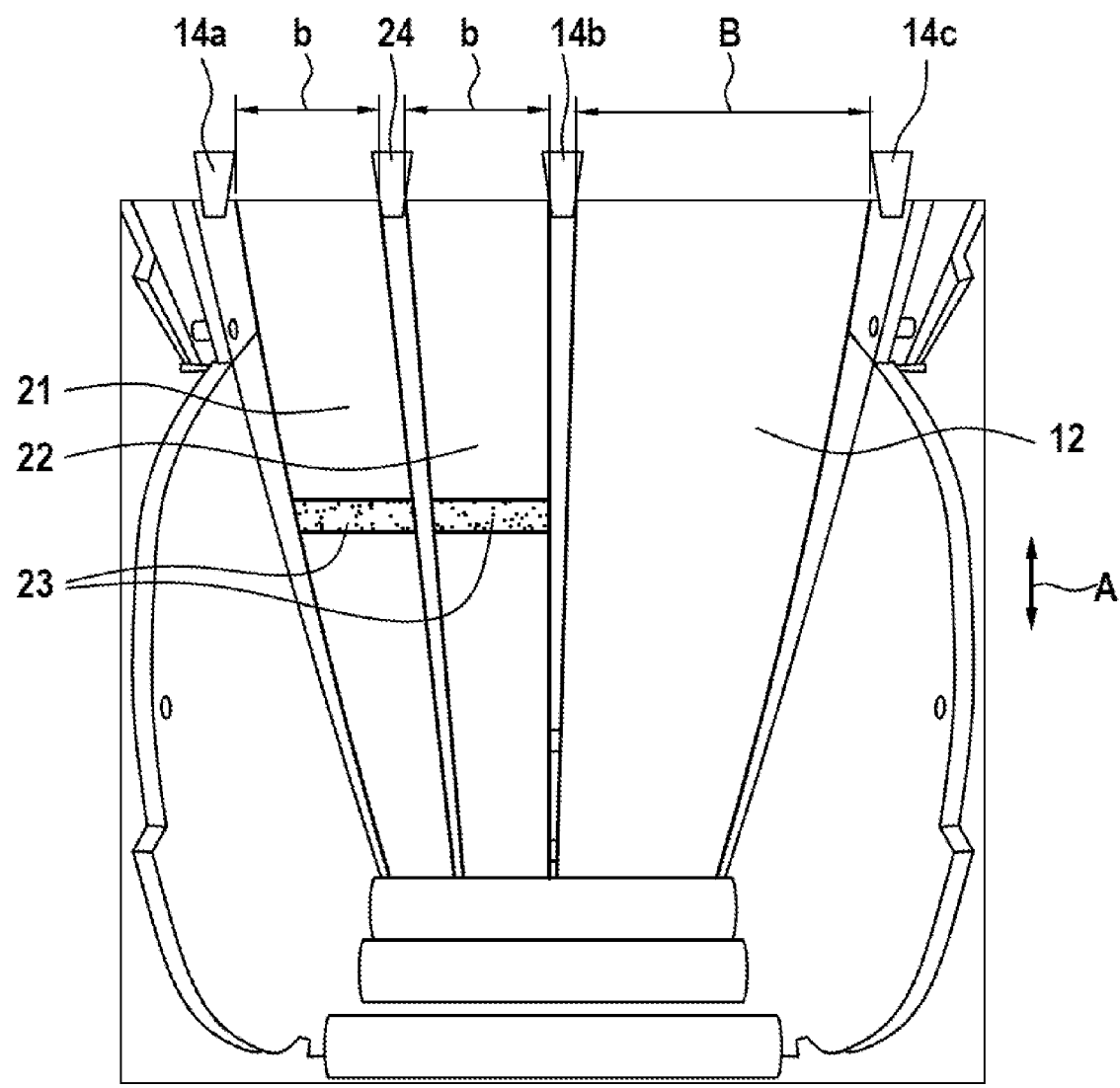
FIG. 4 shows a schematic illustration of the baler belts running in the round baler (based on the 900 Series round baler from John Deere) and having guide disks, with a repair, conversion or retrofit kit according to the disclosure.

FIG. 3 shows a perspective schematic illustration of a round baler 1 and the inner workings thereof with a repair, conversion or retrofit kit according to the disclosure. FIG. 4 shows a schematic illustration of the baler belts 12, 21, 22 running in the round baler 1 and having guide disks 14*a*, 14*b*, 14*c*, 24, with a repair, conversion or retrofit kit according the disclosure.

The round baler 1 in FIGS. 3 and 4 differs from the known round baler 1 in FIGS. 1 and 2 in that in this case a repair, conversion or retrofit kit 20 according to the invention was used. This repair, conversion or retrofit kit comprises a first replacement baler belt 21 and a second replacement baler belt 22 which each have a width b, the sum of which corresponds substantially to the width B of the baler belt 11 to be replaced. In this way, after installation of the two replacement baler belts 21, 22, the round baler 1 can continue its use substantially as before such that the damaged baler belt 11 can be replaced successfully. In this case, according to the disclosure, this repair is simplified and accelerated in that two narrower replacement baler belts 21, 22 can be mounted more easily, more quickly and with fewer aids than a baler belt 11, 12 which corresponds to the original baler belt 11, 12.

In order to continuously close the two replacement baler belts 21, 22, provision is made of connecting means 23 which are hook connectors 23. Hook connectors 23 can be connected together quickly and easily and without large aids and the two replacement baler belts 21, 22 can be closed quickly and easily in this way. At the same time, they represent a simple, secure and highly loadable connection which is tried and tested for continuously closed baler belts, but which is no longer usable at widths B of the baler belts 11, 12 to be replaced. For the smaller width b of the two replacement baler belts 21, 22, hook connectors 23 are highly applicable, however.

In addition, an additional guide means 24 in the form of an auxiliary guide disk 24 is provided fixedly on the rotatable shaft 13 of the round baler 1, i.e. is able to rotate together with the rotatable shaft 13 without relative movement. The auxiliary guide disk 24 includes two substantially identical half disks such that the latter can be arranged around the rotatable shaft 13, closed and connected to the rotatable shaft 13 quickly and easily, without the rotatable shaft 13 having to be removed therefor. This auxiliary guide disk 24 guides the first replacement baler belt 21 from the right-hand side and the second replacement baler belt 22 from the left-hand side, just as the guide disks 14a, 14b, 14c do with regard to the two (original) baler belts 11, 12. In this case, the left-hand guide disk 14a then guides the first replacement baler belt 21 from the left-hand side and the central guide disk 14b guides the second replacement baler belt 22 from the right-hand side. This ensures that the two replacement baler belts 21, 22 also run in a secure and guided manner.

LIST OF REFERENCE SIGNS (PART OF THE DESCRIPTION)

A Running direction of the baler belts 11, 12, 21, 22
B Width of a baler belt 11, 12 to be replaced
b Width of a replacement baler belt 21, 22
1 Round baler
10 Round bale
11 First baler belt (to be replaced), first original baler belt
12 Second baler belt (to be replaced), second original baler belt
13 Shaft
14a Left-hand guide disk of the shaft 13
14b Central guide disk of the shaft 13
14c Right-hand guide disk of the shaft 13
21 First replacement baler belt
22 Second replacement baler belt
23 Connecting means or hook connector of the replacement baler belts 21, 22
24 Guide means or auxiliary guide disk of the shaft 13

We claim:

1. A repair, conversion or retrofit kit for a round baler, the kit comprising at least two closable replacement baler belts which correspond in their combined width to the width of a baler belt to be replaced; wherein the at least two replacement baler belts are closable in a force-fitting or form-fitting manner, at least partially, by hook connectors; wherein the repair, conversion or retrofit kit further comprises at least one auxiliary guide disk configured in a split manner such that it may be fastened to a rotatable shaft of the round baler by placing the at least one auxiliary guide disk around the rotatable shaft; wherein the at least one auxiliary guide disk is configured as two half-disks; wherein the at least one auxiliary guide disk is fastened to the rotatable shaft between a central guide disk of the rotatable shaft and either a left-hand guide disk of the rotatable shaft or a right-hand guide disk of the rotatable shaft; wherein the at least one auxiliary guide disk is fastened to the rotatable shaft between opposing edges of two of the at least two replacement baler belts; wherein the at least two closable replacement baler belts are connectable without cold vulcanization, and wherein full tensile loading is immediately available after closing of the at least two closable replacement baler belts; and, wherein, when the kit is installed on the round baler, the round baler has the at least two replacement baler belts and an original baler belt, and wherein the at least two replacement baler belts correspond in their joint width to the width of the original baler belt.

2. The repair, conversion or retrofit kit according to claim 1, wherein the at least two replacement baler belts have the same width.

3. The repair, conversion or retrofit kit according to claim 1 further comprising screws, clamps, split pins, or wire for fastening the at least one auxiliary guide disk to the rotatable shaft.

4. The repair, conversion or retrofit kit according to claim 1 wherein the at least two closable replacement baler belts and the at least one auxiliary guide disk are arranged on the round baler such that the at least two closable replacement baler belts each extend laterally with respect to the at least one auxiliary guide disk, and wherein the at least two closable replacement baler belts are guided laterally with respect to one another.

* * * * *